(12) United States Patent
Liu

(10) Patent No.: US 11,375,169 B2
(45) Date of Patent: Jun. 28, 2022

(54) VIDEO CONFERENCE PANORAMIC IMAGE SPREADING METHOD

(71) Applicant: MAGIC CONTROL TECHNOLOGY CORP., New Taipei (TW)

(72) Inventor: Pei-Chung Liu, New Taipei (TW)

(73) Assignee: Magic Control Technology Corp., New Taipei (TW)

( * ) Notice: Subject to any disclaimer, the term of this patent is extended or adjusted under 35 U.S.C. 154(b) by 329 days.

(21) Appl. No.: 16/782,236

(22) Filed: Feb. 5, 2020

(65) Prior Publication Data

US 2021/0176444 A1 Jun. 10, 2021

(30) Foreign Application Priority Data

Dec. 9, 2019 (TW) .................................. 108144979

(51) Int. Cl.
*H04N 13/111* (2018.01)
*H04N 7/15* (2006.01)
*H04N 13/282* (2018.01)

(52) U.S. Cl.
CPC ........... *H04N 13/111* (2018.05); *H04N 7/157* (2013.01); *H04N 13/282* (2018.05)

(58) Field of Classification Search
USPC ................................ 348/14.02, 14.08, 14.09
See application file for complete search history.

(56) References Cited

U.S. PATENT DOCUMENTS

| 8,111,282 B2* | 2/2012 | Cutler ...................... H04N 7/15 348/14.01 |
| 9,842,624 B2* | 12/2017 | Das ...................... H04N 5/2259 |
| 2021/0127059 A1* | 4/2021 | Powell ............... G02B 13/0005 |

FOREIGN PATENT DOCUMENTS

| TW | I549070 B | 9/2016 |
| TW | I633499 B | 8/2018 |

* cited by examiner

*Primary Examiner* — Maria El-Zoobi
(74) *Attorney, Agent, or Firm* — Rosenberg, Klein & Lee

(57) ABSTRACT

A video conference panoramic image spreading method is provided, in which an image capturing (acquiring) step is applied by using at least one panoramic camera to capture at least one video conference panoramic picture or image and a bodily human features recognition step is applied to achieve bodily human features recognition for recognizing each of conferee photographed subjects in the video conference panoramic picture or image, and then, based on the result of bodily human features recognition, steps of searching out a dividing point for a two-dimensional (2D) spread picture, image cutting and two-dimensional picture spreading, and stitching are carried out so as to avoid, in a real-time manner, conflicts of cutting of a human body in the conference panoramic picture or image based on the dividing point for two-dimensional spreading and correct the dividing point, for acquiring a two-dimensional panoramic picture that instantaneously reflects and completely and correctly corresponds to a primitive video conference panoramic picture.

12 Claims, 15 Drawing Sheets

VIDEO CONFERENCE PANORAMIC IMAGE SPREADING METHOD

BACKGROUND OF THE INVENTION

1. Field of the Invention

The present invention relates to a video conference panoramic image spreading method, and more particularly to a method that achieves avoiding, adjusting, stitching and spreading with dividing points acquired with bodily human features recognition as basis for two-dimensional panoramic picture spreading.

2. The Related Arts

Heretofore, a panoramic camera is widely used in indoor 360-degree conference panoramic photography and recording events. For example, a panoramic camera having a fisheye lens assembly having multiple lenses may be used to acquire 360-degree panoramic conference pictures or images. However, the fisheye lens used in the conventional the panoramic camera may lead to image distortion of figures and inapplicability for human face recognition, and it often needs to carry out distortion correction, cutting and intercepting, and stitching to provide a two-dimensional panoramic picture. Although image distortion may not occur by using a regular panoramic camera lens that does not involve a fisheye lens, it is still necessary to carry out cutting, intercepting, and stitching of images in order to form a two-dimensional panoramic picture. The 360-degree panoramic conference pictures or images acquired with panoramic cameras having fisheye lens or having no fisheye lens both suffer the problem that a human face of a photographed subject is cut and divided during operations of cutting and intercepting and this eventually leads to a two-dimensional panoramic picture that is formed through stitching involving the human face of the photographed subject being split and arranged at two opposite sides. This is a challenge that must be overcome for spreading of a video conference panoramic image acquired with a panoramic camera.

As shown in FIGS. 1 and 2, photographing made with a typical known fisheye lens based panoramic camera and cutting and stitching of a 360-degree panoramic conference picture or image are illustrated, in which to avoid intercepting, a reference object B is set up at a selected angular position of a conference table A, such as a 90-degree position (namely the 12-o'clock direction), so that a panoramic camera C set on the conference table A is provided with a reference point for cutting and stitching of a 360-degree panoramic conference picture or image. In order for photographed subjects D1, D2, D3, D4 that participate a video conference to avoid a human face of any one of the photographed subjects D1, D2, D3, D4 being cut and split during cutting and stitching of the 360-degree panoramic conference picture or image, seats for the photographed subjects D1, D2, D3, D4 must be particularly arranged in order to avoid a coverage arrangement in front of the reference object B, so that a user, when attempting to select and determine a starting point for cutting the 360-degree panoramic conference picture or image cut the starting point, may use the reference object B as the starting point for cutting of the 360-degree panoramic conference picture or image. This, however, requires at least one lens or one side of the panoramic camera C in alignment with the reference object B, and this imposes significant limitation to the installation and range of application of the panoramic camera C. However, locations and quantity of the seats for the photographed subjects D1, D2, D3, D4 are also subjected to unnecessary constraints, making it no industrial value and economic advantages.

Further, prior art patent documents are known, such as Taiwan Patent No. 1549070, which discloses a mobile device and a control method thereof, of which a purpose is using human face recognition applied to a panoramic image intercepted with a camera lens (an image acquisition unit 110) to control operations of a mobile device to enter sleeping and deactivating a screen or activating a screen. Similar to what described above, no solution was proposed for overcoming the issue of cutting and splitting a human face or a human body of a photographed subject during the operations of cutting of a 360-degree panoramic conference picture or image and thus, a final two-dimensional panoramic picture that is formed through stitching may suffer the undesired situation that the human face of one photographed subject is split and arranged at two opposite sides.

Further, Taiwan Patent No. 1633499 discloses a method for displaying a panoramic image and an electronic device thereof, in which displaying is made for illustrating human faces through human face recognition executed in a mobile phone and then through an operation of displaying of a specific one of the human faces, a response is made in a panoramic image displayed on an upper side. This is generally used for panoramic photography with a mobile phone and is not applicable to a general indoor video conference system. Further, a panoramic image displayed with a viewer of the mobile phone is a continuous photographed image and is not a spread two-dimensional panoramic picture formed by processing a panoramic image or picture through intercepting and stitching as described above. In other words, such a known technique is not applicable to processing of cutting and stitching a panoramic image of an indoor conference and there is also no solution to handle the above-discussed problem that a human face or a human body of a photographed subject is cut and split during the operations of cutting and stitching of a panoramic image, and would thus be no industrial value and economic advantage.

SUMMARY OF THE INVENTION

The primary objective of the present invention is to provide a video conference panoramic image spreading method, which eliminates the problems and drawbacks of panoramic cameras discussed above or disclosed in the prior art patent documents that when they are used in applications of 360-degree indoor conference panoramic photography and recording in an operation of a two-dimensional panoramic picture through cutting, stitching and spreading of a 360-degree panoramic conference picture or image captured with the panoramic camera, the human faces or the human bodies of the photographed subjects who participate a conference may be cut and split and eventually a two-dimensional panoramic picture, which is formed through stitching, a human face or a human body of the photographed subjects may be split and arranged at two opposite sides.

Thus, the present invention provides a video conference panoramic image spreading method, which comprises the following steps:

(a) acquiring a primitive panoramic picture or image, in which at least one panoramic camera is used to photograph and capture and thus acquire at least one primitive video conference panoramic picture or image;

(b) performing bodily human features recognition, in which conferee photographed subjects contained in the at least one primitive video conference panoramic picture or image that is photographed and captured and thus acquired by the panoramic camera in Step (a) is individually subjected to bodily human features recognition;

(c) searching out a dividing point for two-dimensional picture spreading and defining the dividing point as a starting point for the two-dimensional panoramic image spreading, in which searching is performed in the primitive video conference panoramic picture or image in which the conferee photographed subjects have been subjected to bodily human features recognition in Step (b) to find a dividing point that does not lead to cutting or dividing of bodily human features of the conferee photographed subjects, and the dividing point is taken as the starting point for spreading a two-dimensional panoramic image;

(d) intercepting desired image regions according to the dividing point, in which cutting and intercepting regions of the primitive video conference panoramic picture or image are performed according to the dividing point found in Step (c), wherein cutting and intercepting are carried out primarily based on a region of each of the conferee photographed subjects in the primitive video conference panoramic picture or image in order to acquire at least one quasi-panoramic image;

(e) carrying out combining and stitching on the quasi-panoramic image by using the starting point for two-dimensional panoramic image spreading, in which the quasi-panoramic image intercepted in Step (d) is subjected to combining and stitching according to the starting point for two-dimensional panoramic image spreading, which is the dividing point of Step (c); and (f) forming a two-dimensional panoramic picture, in which the quasi-panoramic image that has been subjected to combining and stitching in Step (e) forms a spread two-dimensional panoramic picture.

Further, in the video conference panoramic image spreading method according to the present invention, the panoramic camera of Step (a) comprises a panoramic camera having a fisheye lens.

In the above-described video conference panoramic image spreading method according to the present invention, the panoramic camera of Step (a) comprises a panoramic camera having multiple lenses.

In the above-described video conference panoramic image spreading method according to the present invention, bodily human features recognition of Step (b) is applied as features recognition for at least one or a combination of at least two of human face, facial features, upper body contour, and dynamic face image of the conferee photographed subjects.

In the above-described video conference panoramic image spreading method according to the present invention, an operation of searching out the dividing point for two-dimensional picture spreading and defining the dividing point as the starting point of the panoramic image carried out in Step (c) further comprises:

(c1) randomly selecting a test dividing point, in which a test dividing point is randomly picked in the primitive video conference panoramic picture or image of which the conferee photographed subjects contained therein have been individually subjected to the bodily human features recognition in Step (b);

(c2) identifying if the test dividing point cuts and divides bodily human features and carrying out Step (c21), if positive, and carrying out Step (c22), if negative, in which determination is made on whether bodily human features of any one of the conferee photographed subjects of Step (c1) is cut and divided by the test dividing point picked in Step (c1);

(c21) moving the test dividing point, in which the test dividing point of Step (c1) is moved in a clockwise direction or a counterclockwise direction and repeating Step (c2);

(c22) setting the test dividing point as the dividing point for two-dimensional picture spreading, in which a test dividing point that does not cut and divide, in Step (c2), the bodily human features of any one of the conferee photographed subjects of Step (c) is taken as the dividing point for spreading of the two-dimensional picture; and (c3) ending.

In the above-described video conference panoramic image spreading method according to the present invention, Step (a)-Step (f) are provided as image processing software pre-loaded in the panoramic camera of Step (a).

In the above-described video conference panoramic image spreading method according to the present invention, the panoramic camera of Step (a) is connected to at least one image processor, and Step (a)-Step (f) are provided as image processing software pre-loaded in the image processor.

In the above-described video conference panoramic image spreading method according to the present invention, the panoramic camera of Step (a) is connected to at least one smart communication device, and Step (a)-Step (f) are provided as image processing software pre-loaded in the smart communication device.

In the above-described video conference panoramic image spreading method according to the present invention, the smart communication device to which the panoramic camera of Step (a) is connected comprises a smart mobile phone.

In the above-described video conference panoramic image spreading method according to the present invention, the smart communication device to which the panoramic camera of Step (a) is connected comprises a tablet computer.

In the above-described video conference panoramic image spreading method according to the present invention, the panoramic camera of Step (a) is connected to at least one desk-top computer, and Step (a)-Step (f) are provided as image processing software pre-loaded in the desk-top computer.

In the above-described video conference panoramic image spreading method according to the present invention, the panoramic camera of Step (a) is connected to at least one notebook computer, and Step (a)-Step (f) are provided as image processing software pre-loaded in the notebook computer.

The efficacy of the video conference panoramic image spreading method according to the present invention is that through each step of the above-discussed Step (a)-(f), conferee photographed subjects contained in at least one primitive video conference panoramic picture or image that is photographed, captured, and thus acquired by a panoramic camera are subjected to bodily human features recognition in respect of human face, facial features, upper body contour, or dynamic face image and a processing result of bodily human features recognition is taken as a basis for selecting a dividing point and a starting point for carrying out cutting and spreading of the primitive video conference panoramic picture or image to form a two-dimensional panoramic picture and further, the dividing point is randomly movable, so that there is no need to set up a reference object as required by the prior art, and during the course of cutting, selection can be made based on the result of bodily human features recognition applied to each individual conferee photographed subject of the primitive video conference panoramic picture or image to achieve avoiding to thereby completely overcome the drawback or problem of the prior art that a human face or a human body of the conferee photographed subjects contained in a 360-degree panoramic conference picture or image is cut and split during an operation of cutting and eventually leading to the human face or the human body of the conferee photographed subjects that has been cut is split and arranged at two opposite sides of a two-dimensional panoramic picture that is formed through stitching, without adding any instrument and cost. Further, the result of bodily human features recognition for each conferee photographed subject contained in the primitive video conference panoramic picture or image as proposed in the present invention may be later used in applications for instantaneous change, magnifying, locking, and tracking of image for at least one selected conferee photographed subject in the spread two-dimensional panoramic picture so as to further improve the industrial value and economic advantage of the present invention.

DETAILED DESCRIPTION OF THE PREFERRED EMBODIMENTS

Figure 1:
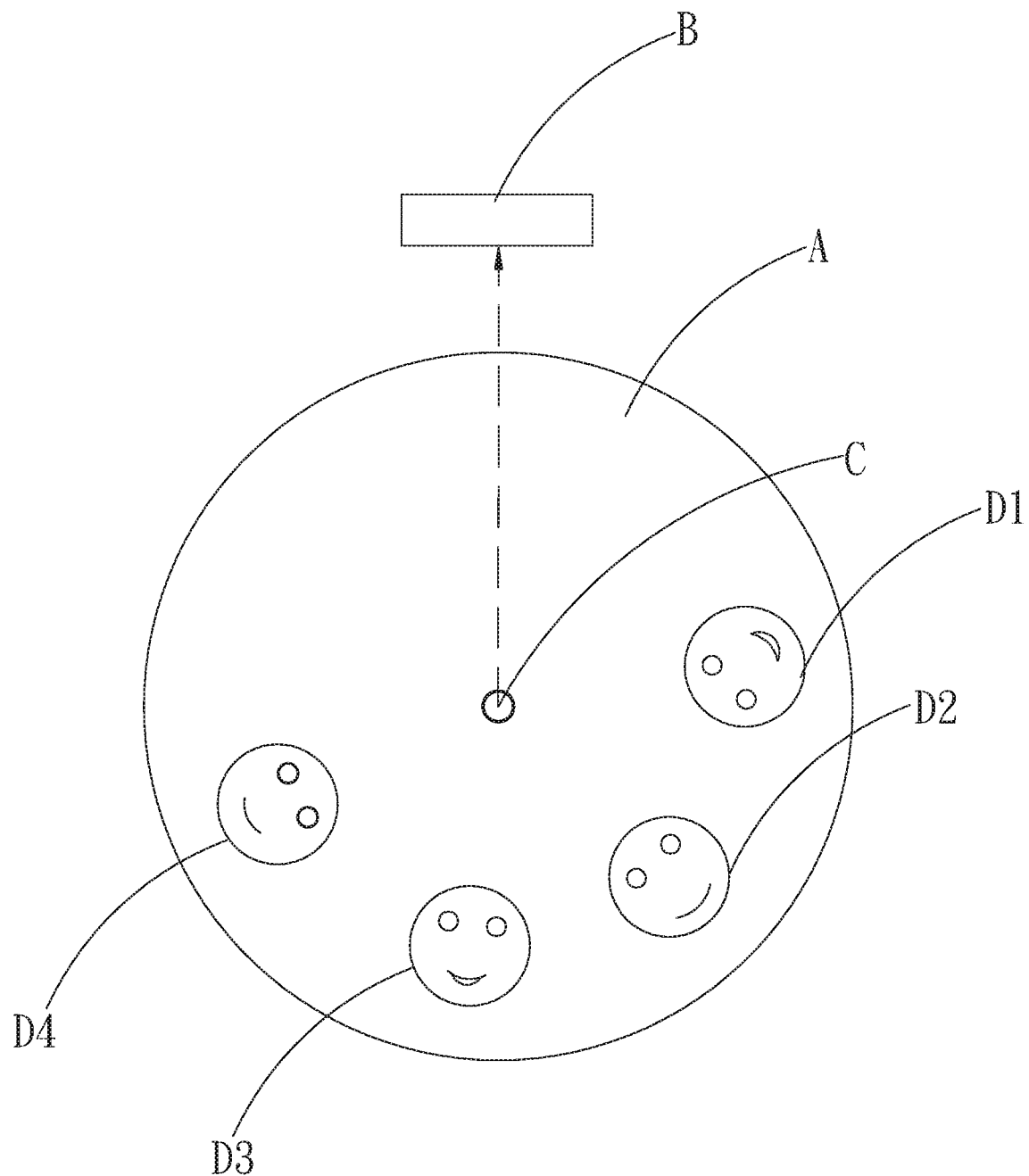
FIG. 1 is a schematic view illustrating operation of a prior art video conference panoramic image spreading method.
Figure 2:
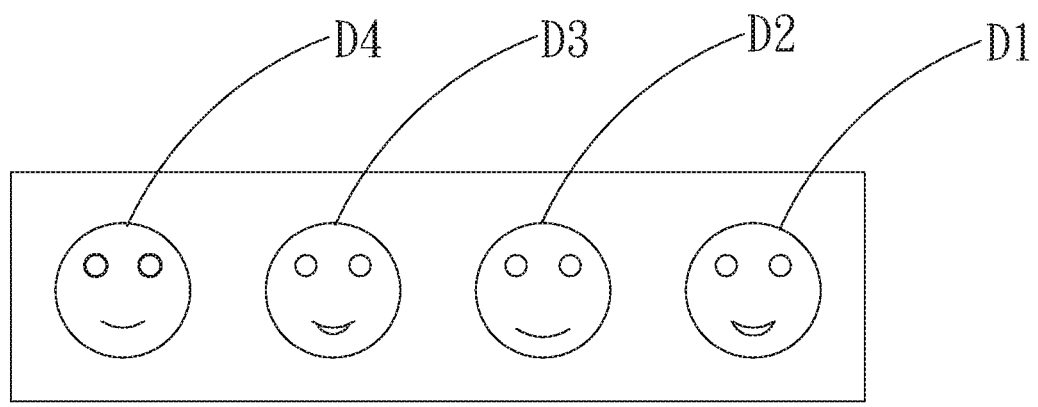
FIG. 2 is a schematic view showing a prior art way of spreading a two-dimensional panoramic image for FIG. 1.
Figure 3:
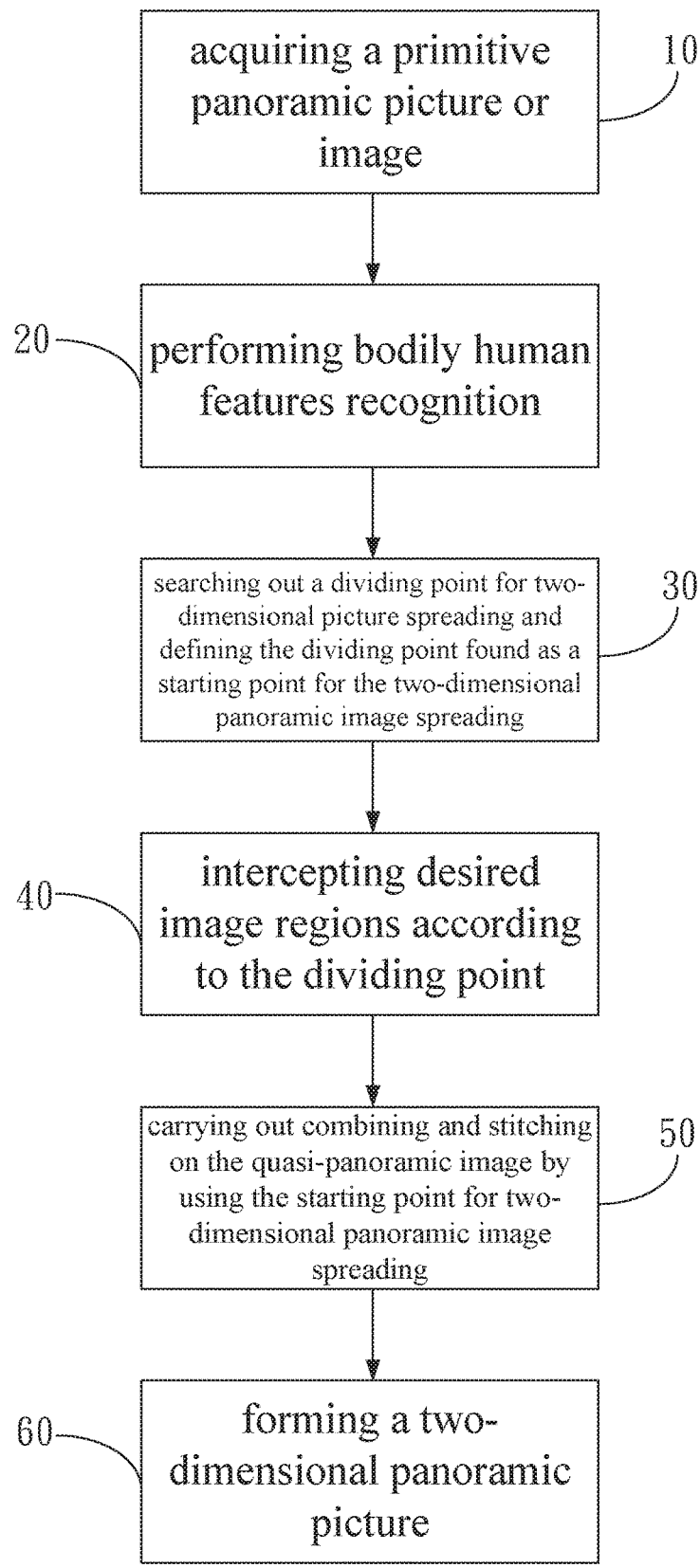
FIG. 3 is a flowchart of a video conference panoramic image spreading method according to the present invention.
Figure 4:
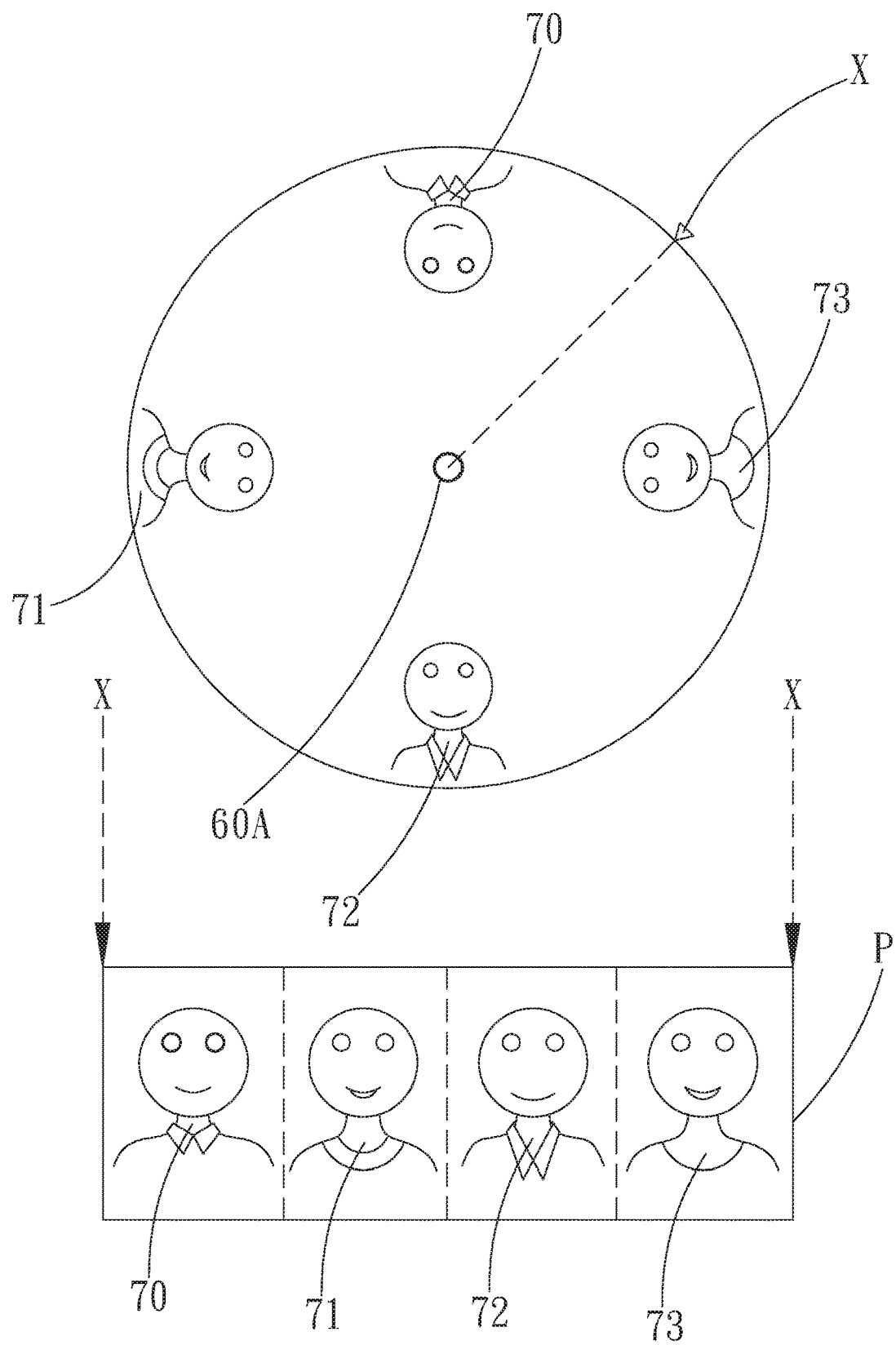
FIG. 4 is a schematic view illustrating operation of cutting and intercepting of the video conference panoramic image spreading method according to a first embodiment of the present invention.
Figure 5:
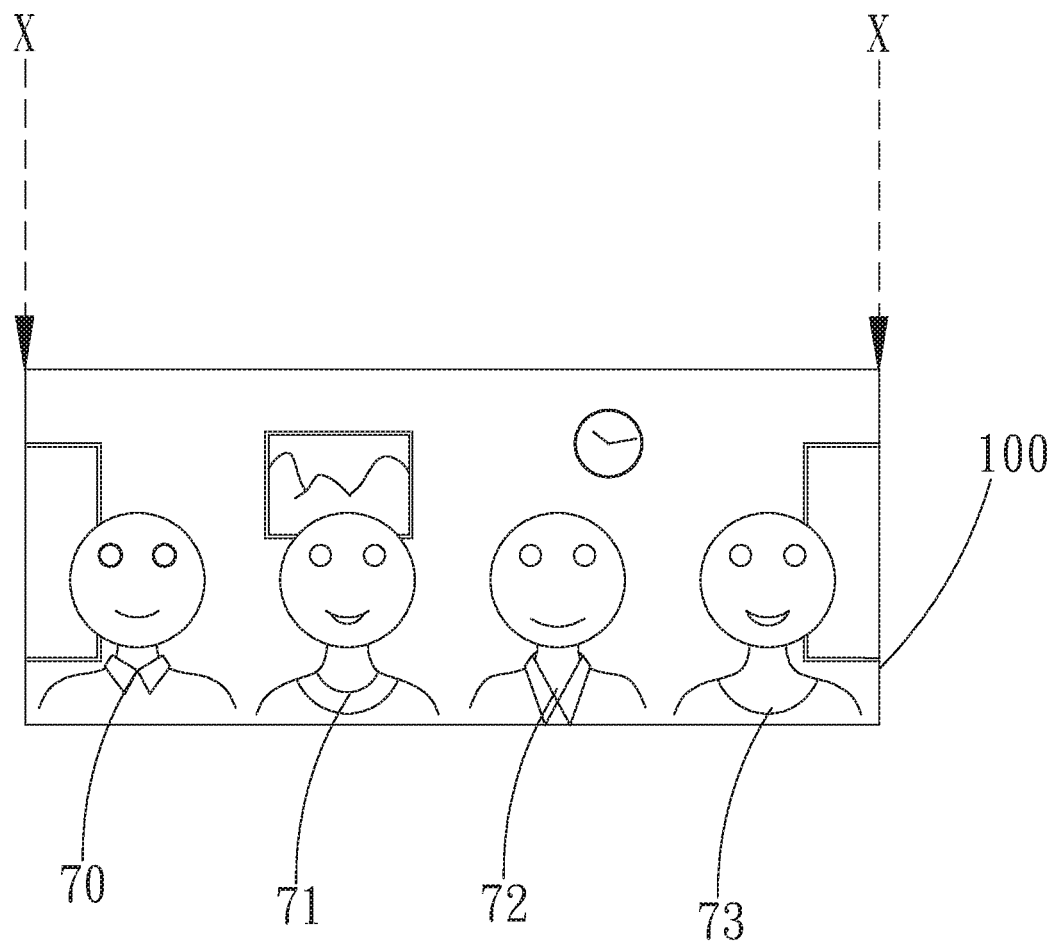
FIG. 5 is a schematic view showing spreading of a two-dimensional panoramic picture of the video conference panoramic image spreading method according to the first embodiment of the present invention.

Referring to illustrations of FIGS. 3, 4, and 5, FIG. 3 is a flow chart of a video conference panoramic image spreading method according to the present invention, of which steps include Step 10-60, wherein:

(10) acquiring a primitive panoramic picture or image, in which at least one panoramic camera 60A (as shown in FIG. 4) is used to photograph and capture, and thus acquire at least one primitive video conference panoramic picture or image, the panoramic camera 60A being not limited to any specific type, a panoramic camera having fisheye lens being taken as an example of the present invention, a panoramic camera having multiple lenses being also considered falling in the scope of the present invention;

(20) performing bodily human features recognition, in which conferee photographed subjects 70, 71, 72, 73 contained in the at least one primitive video conference panoramic picture or image that is photographed and captured and thus acquired by the panoramic camera 60A in Step 10 is individually subjected to performance of bodily human features recognition, the bodily human features recognition being not limited any specific item, features recognition for at least one or a combination of at least two of human face, facial features, upper body contour, and dynamic face image of the conferee photographed subjects 70, 71, 72, 73 being taken as an example of the present invention;

(30) searching out a dividing point for two-dimensional picture spreading and defining the dividing point found as a starting point for the two-dimensional panoramic image spreading, in which searching is performed in the primitive video conference panoramic picture or image in which the conferee photographed subjects 70, 71, 72, 73 have been subjected to bodily human features recognition in Step 20 to find a dividing point X (as shown in FIGS. 4 and 5) that does not lead to cutting or dividing of bodily human features of the conferee photographed subjects 70, 71, 72, 73 and the dividing point X is taken as the starting point for spreading a two-dimensional panoramic image 100 (as shown in FIG. 5);

(40) intercepting desired image regions according to the dividing point, in which cutting and intercepting regions of the primitive video conference panoramic picture or image are performed according to the dividing point X found in Step 30, wherein cutting and intercepting are carried out primarily based on a region of each of the conferee photographed subjects in the primitive video conference panoramic picture or image in order to acquire at least one quasi-panoramic image P (as shown in the lower part of FIG. 4), wherein the quasi-panoramic image P is not a picture that will be finally displayed and is a virtual picture; and

(50) carrying out combining and stitching on the quasi-panoramic image by using the starting point for two-dimensional panoramic image spreading, in which the quasi-panoramic image P intercepted in Step 40 is subjected to combining and stitching according to the starting point for two-dimensional panoramic image spreading, which is the dividing point X of Step 30, namely cutting is made at a location between the conferee photographed subjects 70 and 73 according to the dividing point X, and images of the conferee photographed subjects 70 and 73, after cutting, are respectively arranged at a leftmost position and a rightmost position, a right side of the image of the conferee photographed subject 70 being adhered to and stitched to a left side of an image of the conferee photographed subject 71, a right side of the image of the conferee photographed subject 71 being adhered to and stitched to a left side of an image of the conferee photographed subject 72, a right side of the image of the conferee photographed subject 72 being adhered to and stitched to a left side of the image of the conferee photographed subject 73; and

(60) forming a two-dimensional panoramic picture, in which the quasi-panoramic image P that has been subjected to combining and stitching in Step 50 forms a spread two-dimensional panoramic picture 100.

The above-described Step 10-60 of the flowchart of the video conference panoramic image spreading method according to the present invention is described by taking an example in which a single dividing point X is used as a starting point for a spread two-dimensional panoramic picture 100 corresponding to the at least one primitive video conference panoramic picture or image. The number and position selection of the dividing point X and combination operations for adhering and stitching are not limited thereto, and alternatively, multiple dividing points X at different positions may be selected as starting points for combining and stitching of the two-dimensional panoramic picture 100, and steps of such a process may carried out according to Step 10-60 described above to similarly acquire a spread two-dimensional panoramic picture 100 according thereto.

Figure 6:
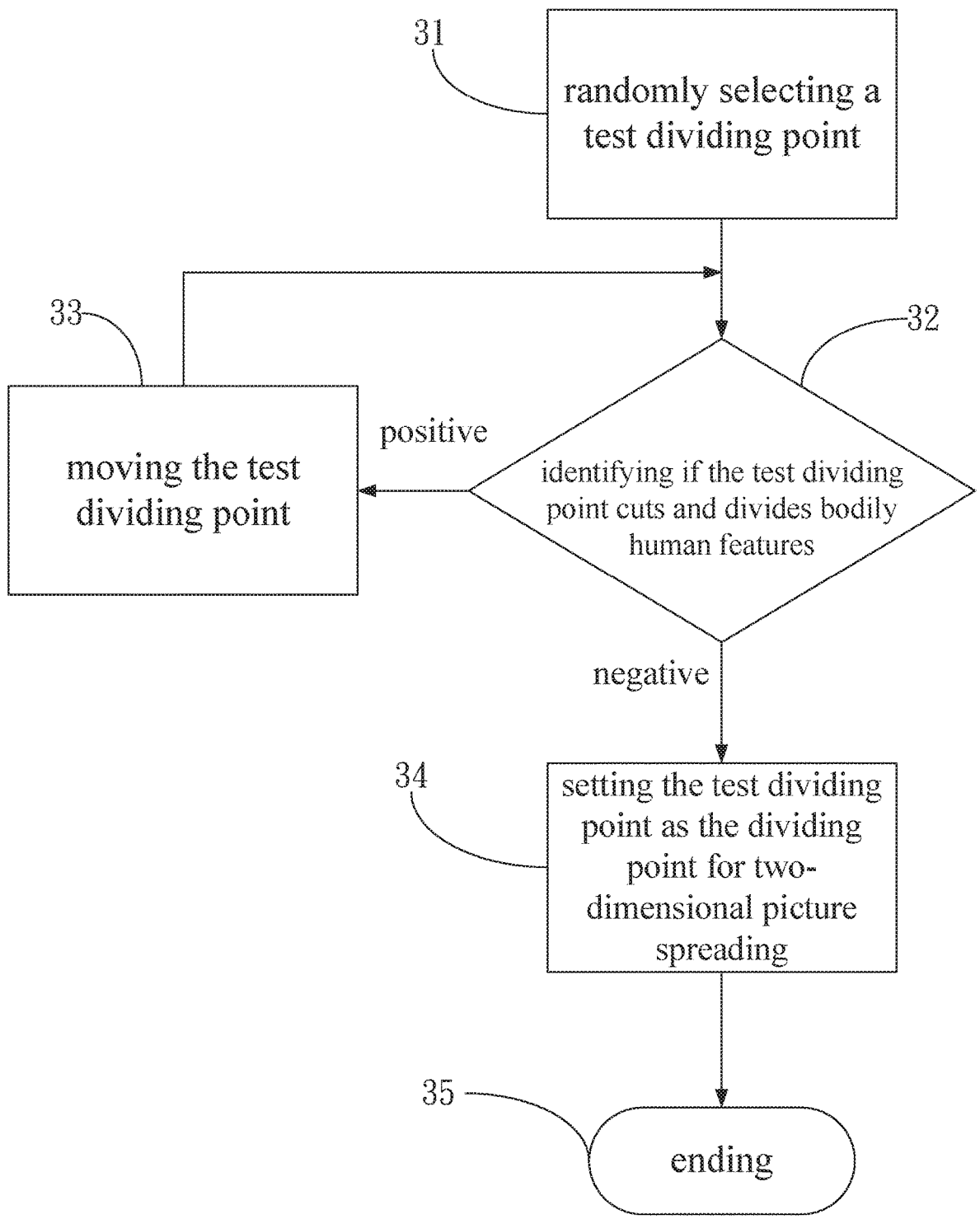
FIG. 6 is a schematic view showing an operation of FIG. 3 for searching for a dividing point for spreading of the two-dimensional picture and defining the dividing point as a starting point for the panoramic image.
Figure 7:
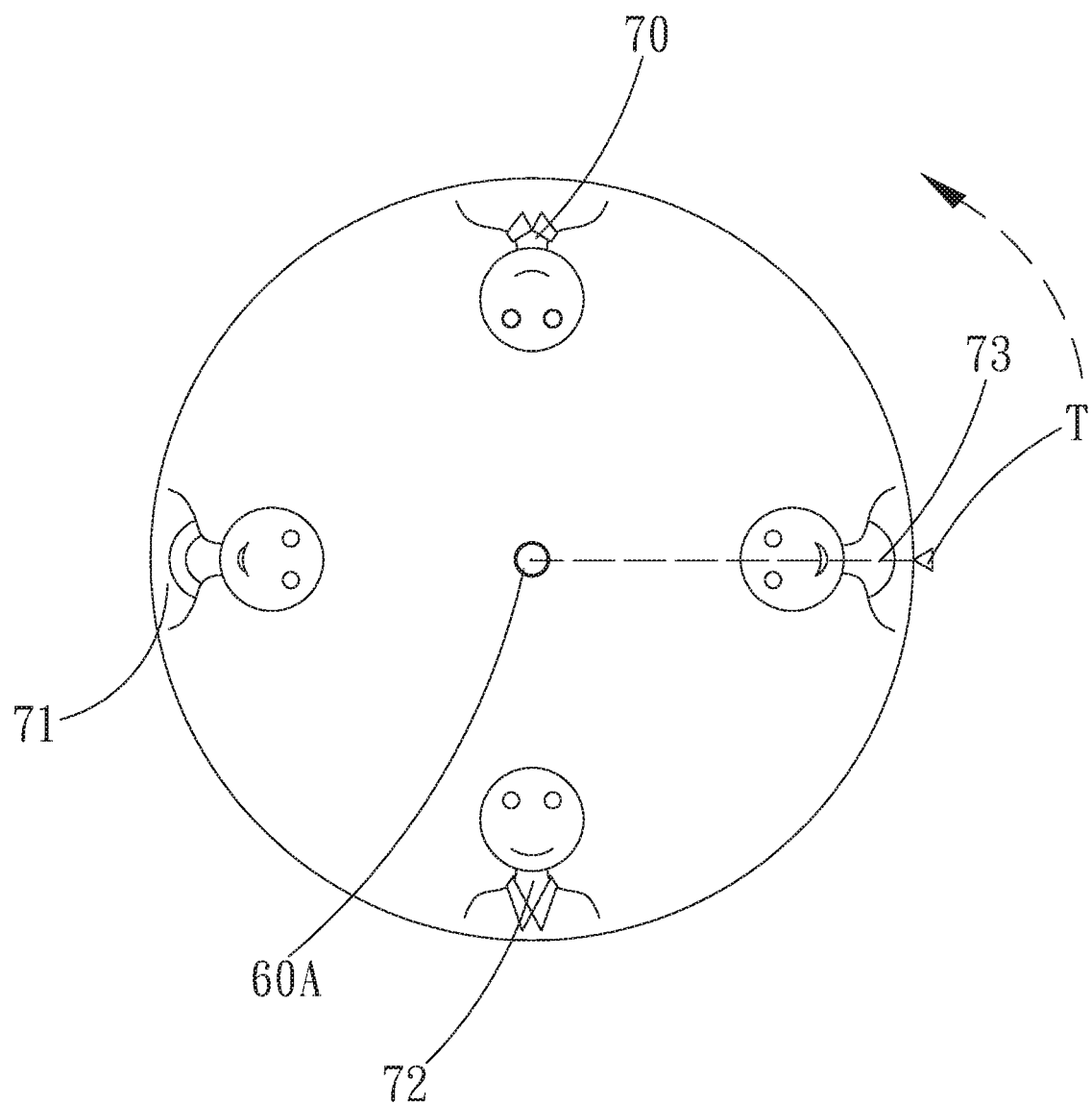
FIG. 7 is a schematic view showing an operation of selecting the dividing point and cutting and intercepting in the video conference panoramic image spreading method according to the first embodiment of the present invention.
Figure 8:
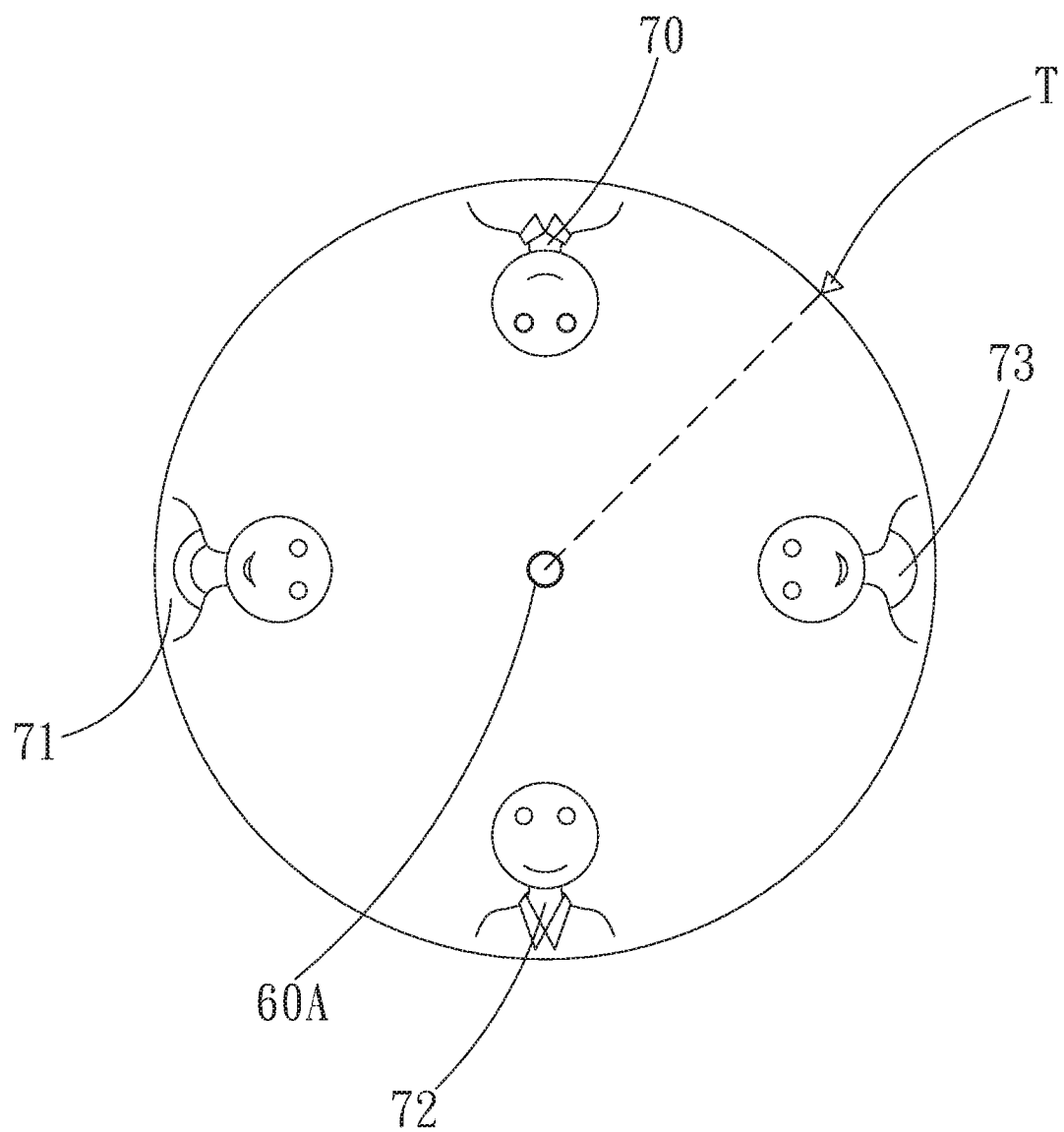
FIG. 8 is an other schematic view showing the operation of selecting the dividing point and cutting and intercepting in the video conference panoramic image spreading method according to the first embodiment of the present invention.

Further referring to illustrations of FIGS. 6 and 7, FIG. 6 is a flowchart illustrating an embodiment of an operation of Step (30) shown in FIG. 3 for searching out a dividing point for two-dimensional picture spreading and defining the dividing point as a starting point of a panoramic image, comprising Step 31-35, wherein:

(31) randomly selecting a test dividing point, in which a test dividing point T (as shown in FIG. 7) is randomly picked in the primitive video conference panoramic picture or image of which the conferee photographed subjects 70, 71, 72, 73 contained therein have been individually subjected to bodily human features recognition in Step 20 of FIG. 3;

(32) identifying if the test dividing point cuts and divides bodily human features and carrying out Step 33, if positive, and carrying out Step 34, if negative, in which determination is made on whether bodily human features of any one of the conferee photographed subjects 70, 71, 72, 73 of Step 31 is cut and divided by the test dividing point T picked in Step 31;

(33) moving the test dividing point, in which the test dividing point T of Step 31 is moved in a clockwise direction or a counterclockwise direction, wherein the test dividing point T that is originally located at a 0-degree position being moved counterclockwise to a 45-degree position (as shown in FIGS. 7 and 8) is taken as an example for illustration of the present invention, and then repeating Step 32;

(34) setting the test dividing point as the dividing point for two-dimensional picture spreading, in which a test dividing point T (as shown in FIG. 8) that does not cut and divide, in Step (32), the bodily human features of any one of the conferee photographed subjects of Step (31) is taken as the dividing point X for spreading of the two-dimensional picture, namely the dividing point X shown in FIG. 4; and

(35) ending.

Step (31)-(35) of the flowchart of the above-described embodiment for searching the dividing point for spreading the two-dimensional picture and defining the dividing point as the starting point of the panoramic image and the schematic views illustrating the operations of cutting corresponding thereto that are explained with reference to FIGS. 6-8 are provide as an example for easily expounding the technical contents and the features of the present invention, and are not intended to unduly constrain the scope of the present invention. It is appreciated that those operations and techniques that are equivalent to what described above are all considered falling in the scope of the present invention.

Step 10-60 of the flowchart of the video conference panoramic image spreading method shown in FIG. 3 can be executed in any suitable measures and means, of which an example includes image processing software pre-loaded in the panoramic camera 60A mentioned in Step 10.

Figure 9:
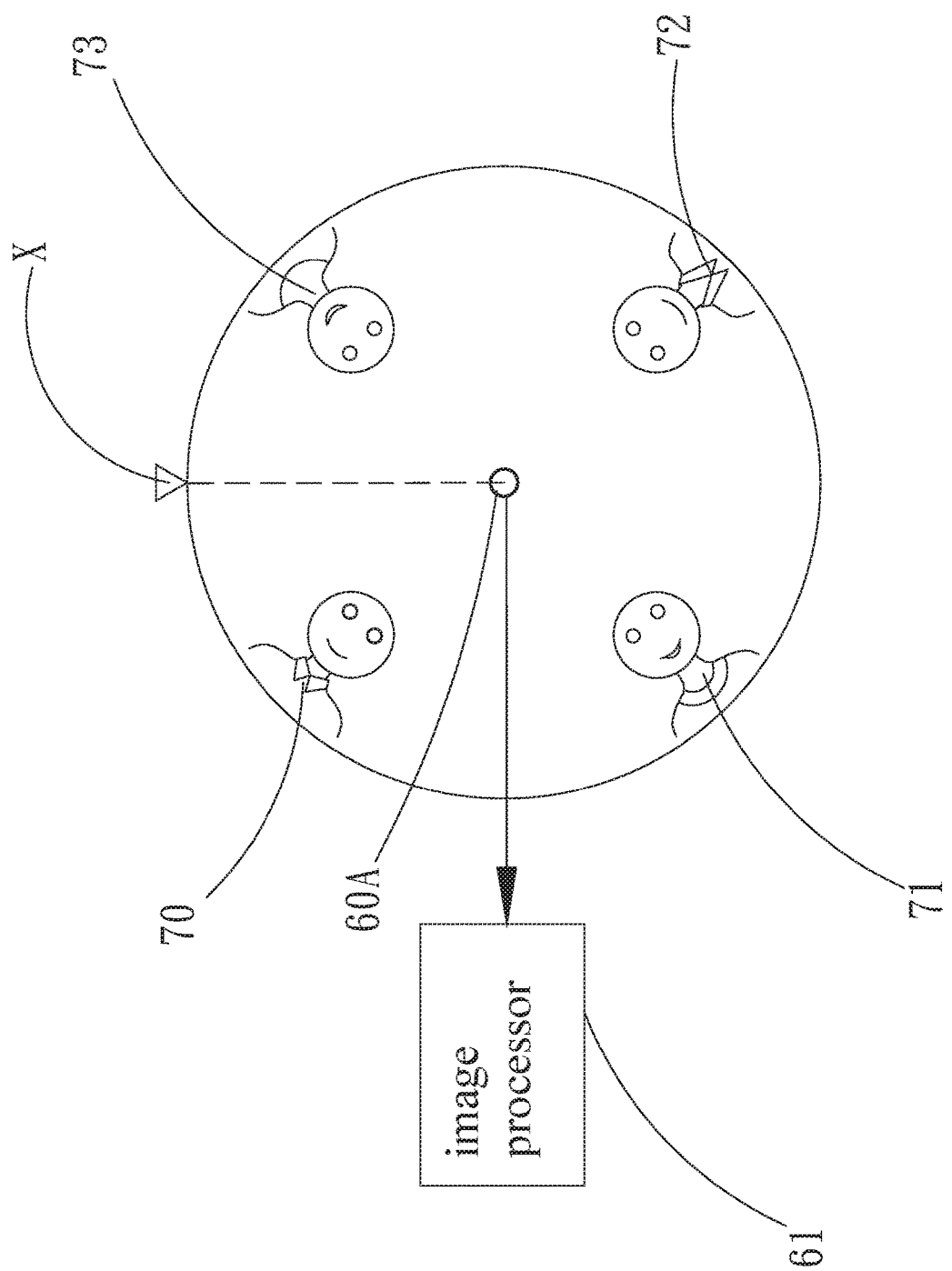
FIG. 9 is a schematic view showing a video conference panoramic image spreading method according to a second embodiment of the present invention.

Further referring to FIG. 9, a second embodiment of the video conference panoramic image spreading method according to the present invention is shown, in which the panoramic camera 60A of Step 10 is shown connected to at least one image processor 61, and the software that executes Step 10-60 of FIG. 3 may be pre-loaded or stored in advance in the image processor 61.

Figure 10:
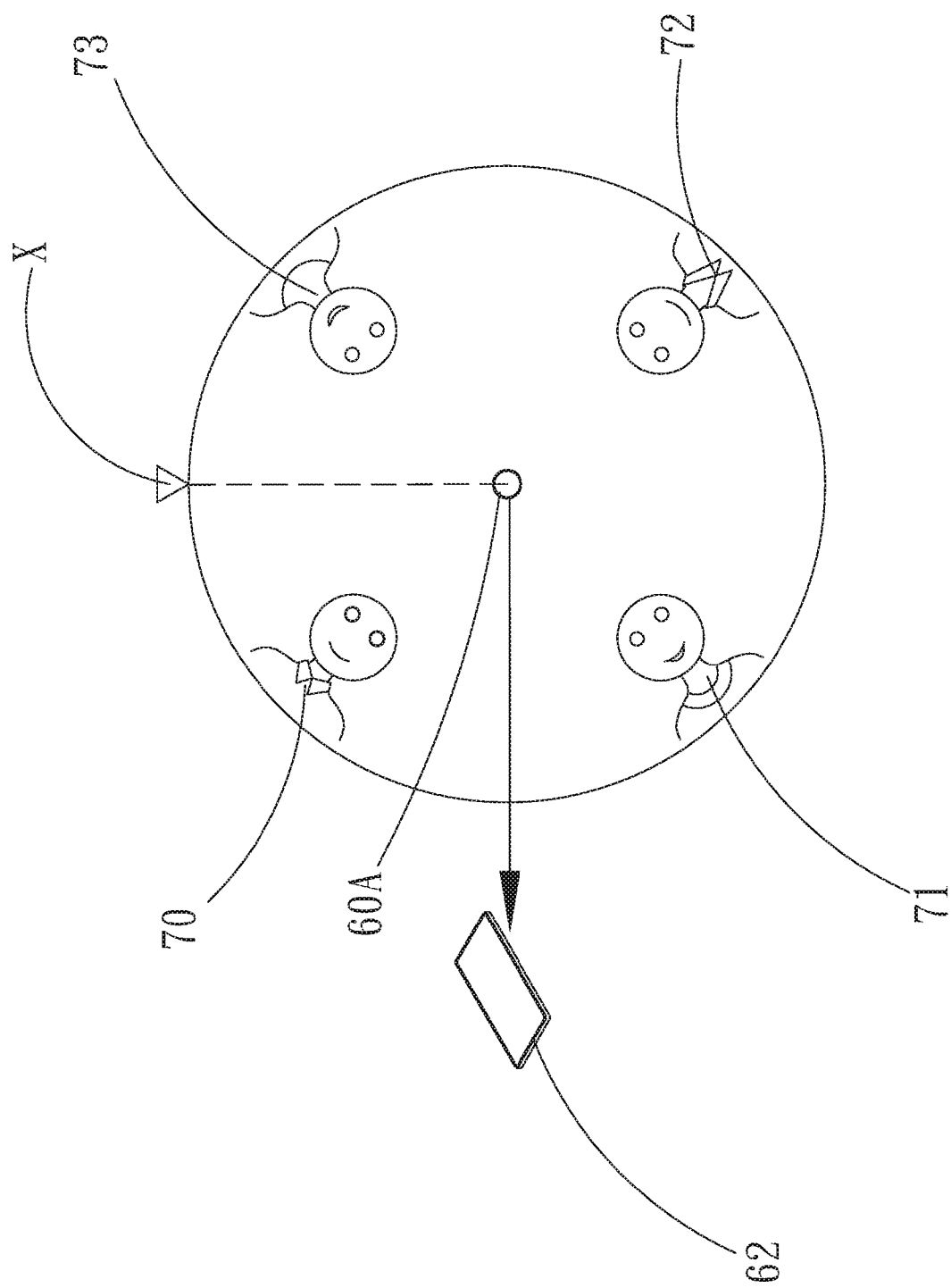
FIG. 10 is a schematic view showing a video conference panoramic image spreading method according to a third embodiment of the present invention.

Referring further to FIG. 10, a third embodiment of the video conference panoramic image spreading method according to the present invention is shown, in which the panoramic camera 60A of Step 10 is shown connected to at least one smart communication device 62, and the software that executes Step 10-60 of FIG. 3 may be pre-loaded or stored in advance in the smart communication device 62. The smart communication device 62 is not limited to any specific type, and a smart mobile phone and a tablet computer are provided as examples in the present invention.

Figure 11:
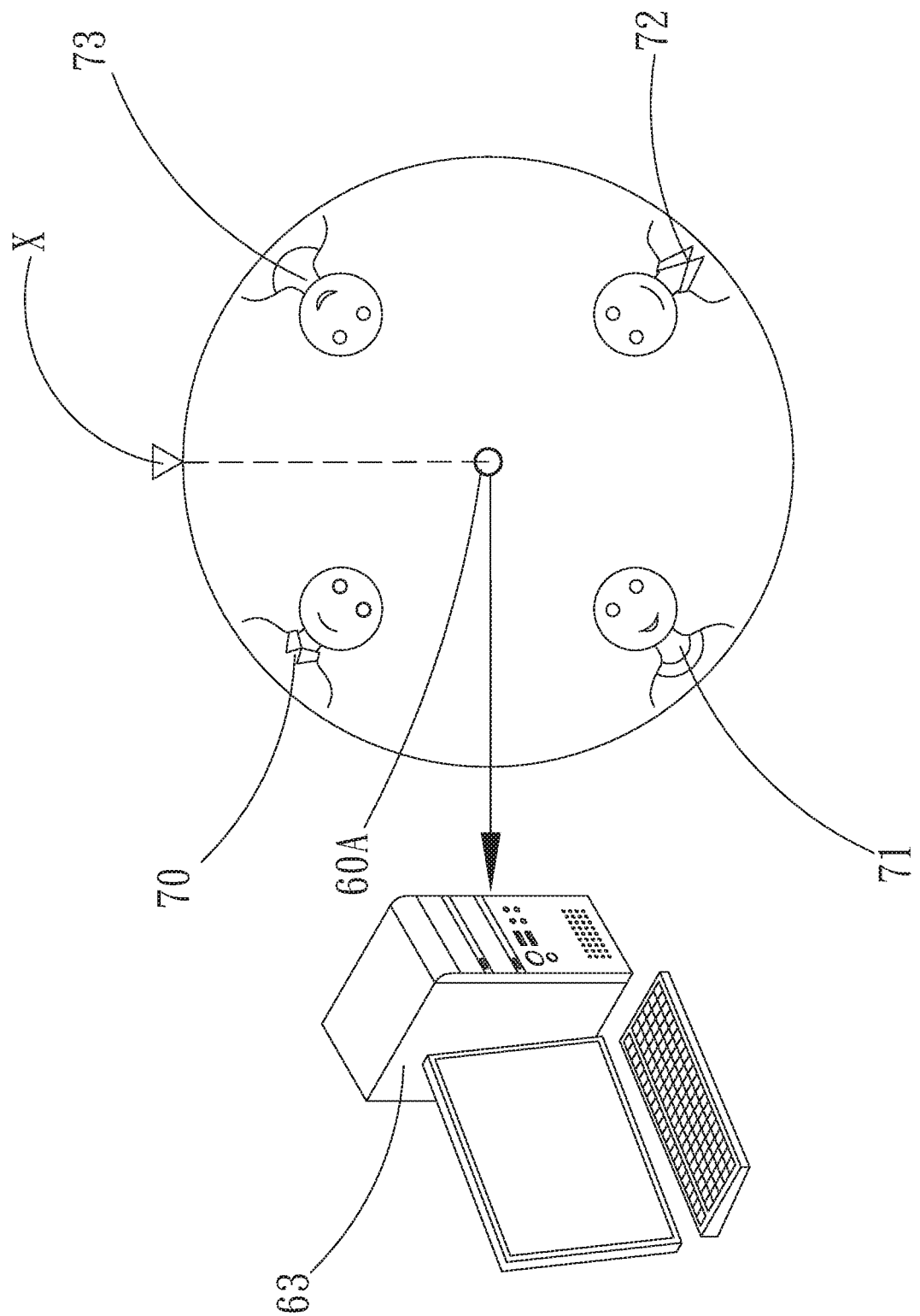
FIG. 11 is a schematic view showing a video conference panoramic image spreading method according to a fourth embodiment of the present invention.

Referring further to FIG. 11, a fourth embodiment of the video conference panoramic image spreading method according to the present invention is shown, in which the panoramic camera 60A of Step 10 is shown connected to at least one desk-top computer 63, and the software that executes Step 10-60 of FIG. 3 may be pre-loaded or stored in advance in the desk-top computer 63.

Figure 12:
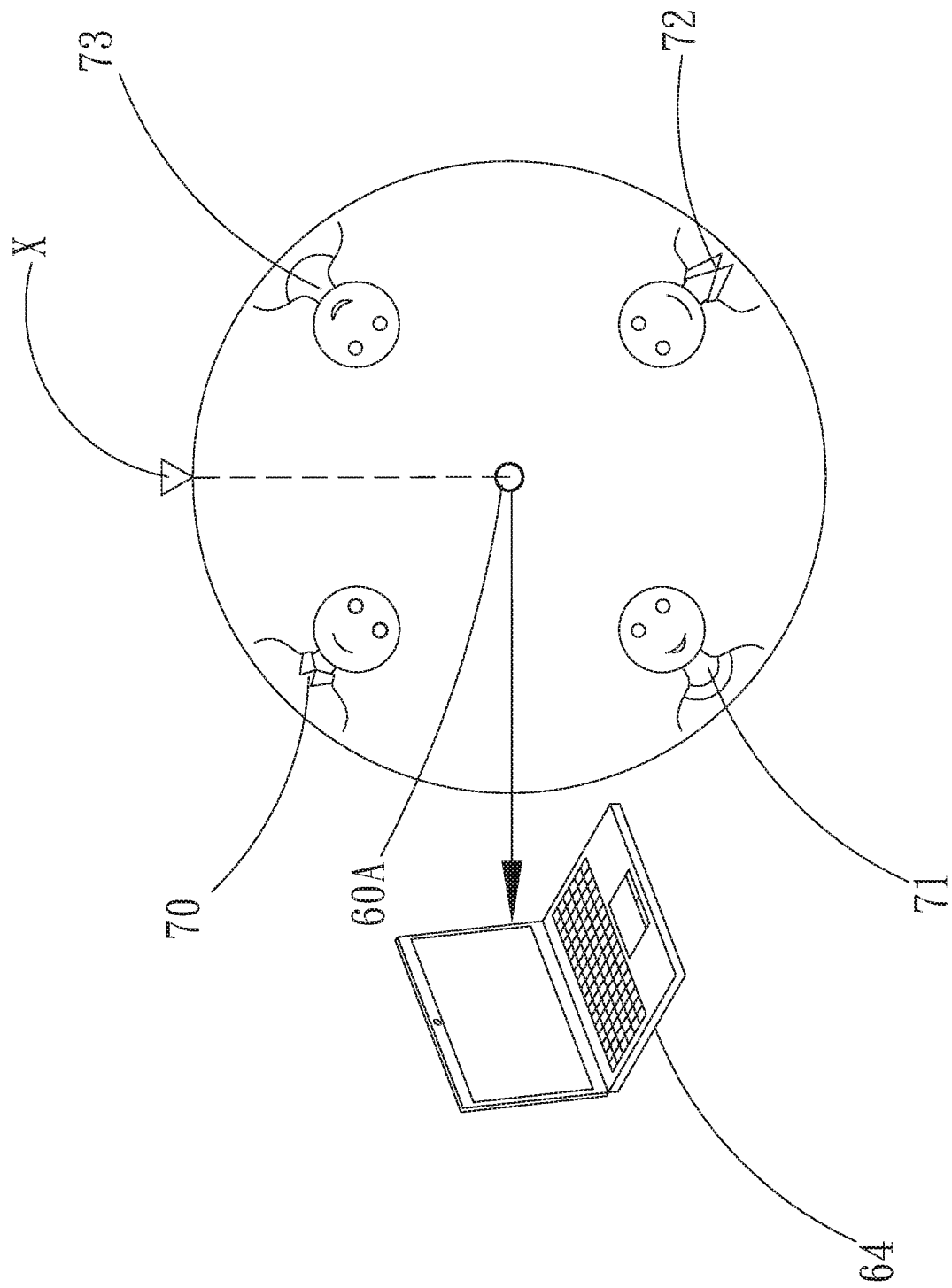
FIG. 12 is a schematic view showing a video conference panoramic image spreading method according to a fifth embodiment of the present invention.

Referring further to FIG. 12, a fifth embodiment of the video conference panoramic image spreading method according to the present invention is shown, in which the panoramic camera 60A of Step 10 is shown connected to at least one notebook computer 64, and the software that executes Step 10-60 of FIG. 3 may be pre-loaded or stored in advance in the notebook computer 64.

Figure 13:
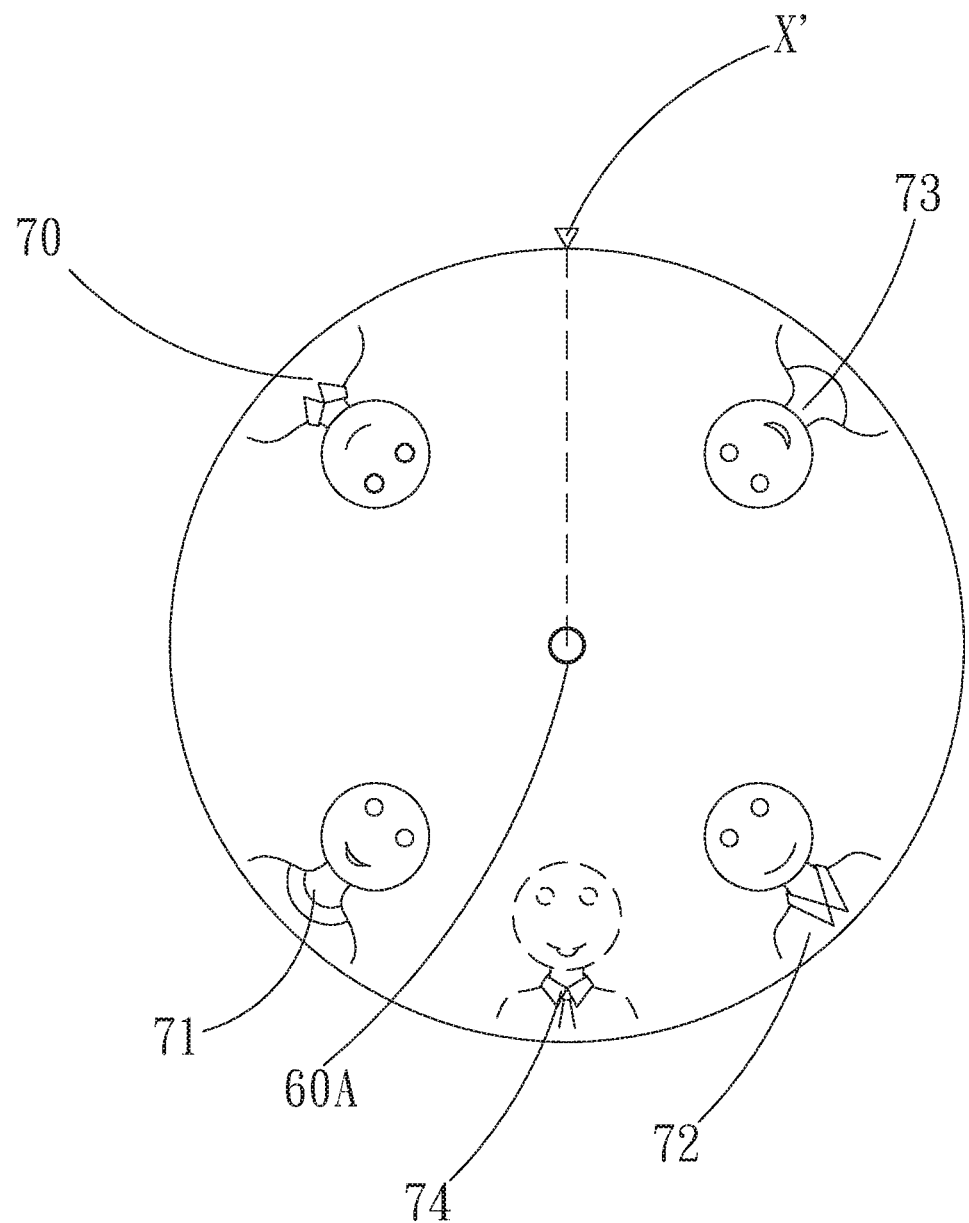
FIG. 13 is a schematic view showing a preferred way of application for the video conference panoramic image spreading method according to the present invention.
Figure 14:
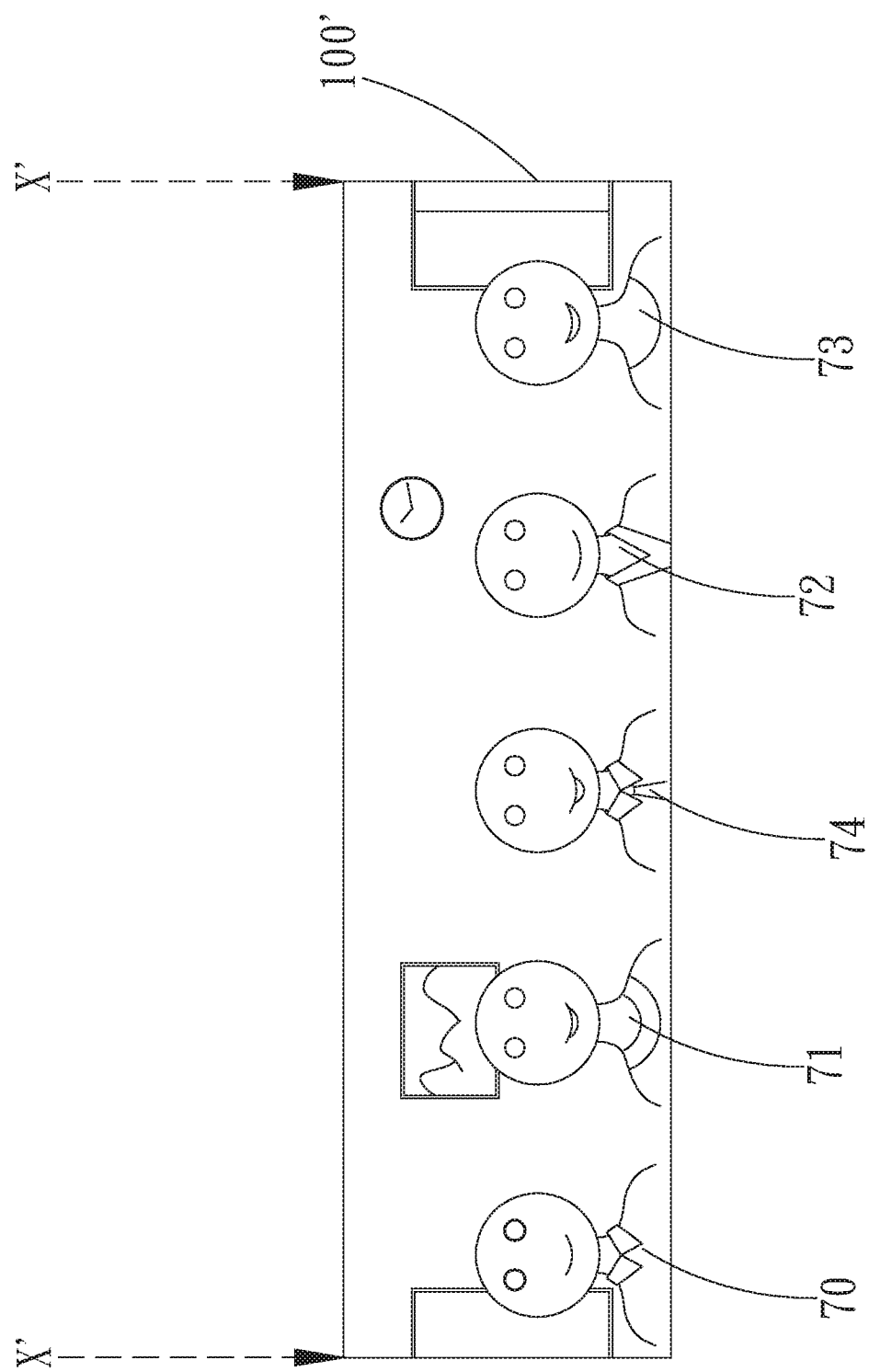
FIG. 14 is a schematic view showing a spread two-dimensional panoramic picture in the application of FIG. 13.

Further referring to FIGS. 13 and 14, an example of a preferred application of the video conference panoramic image spreading method is shown, in which the spread two-dimensional panoramic picture 100 with the four conferee photographed subjects 70, 71, 72, 73 originally shown in FIGS. 4 and 5 is shown and, during the video conference, an additional, new conferee photographed subject 74 instantaneously joints the conference and intervenes between the conferee photographed subjects 71 and 72. The video conference panoramic image spreading method described as Step 10-60 according to the present invention may be similarly applied to subject the conferee photographed subjects 70, 71, 74, 72, 73 to bodily human features recognition and the same process of for re-selection of a new dividing point X' (as shown in FIG. 13) and re-combination through adhering and stitching is carried out to provide a refreshed, updated result of a spread two-dimensional panoramic picture 100' (as shown in FIG. 14) in which the conferee photographed subjects 70, 71, 74, 72, 73 are included.

Figure 15:
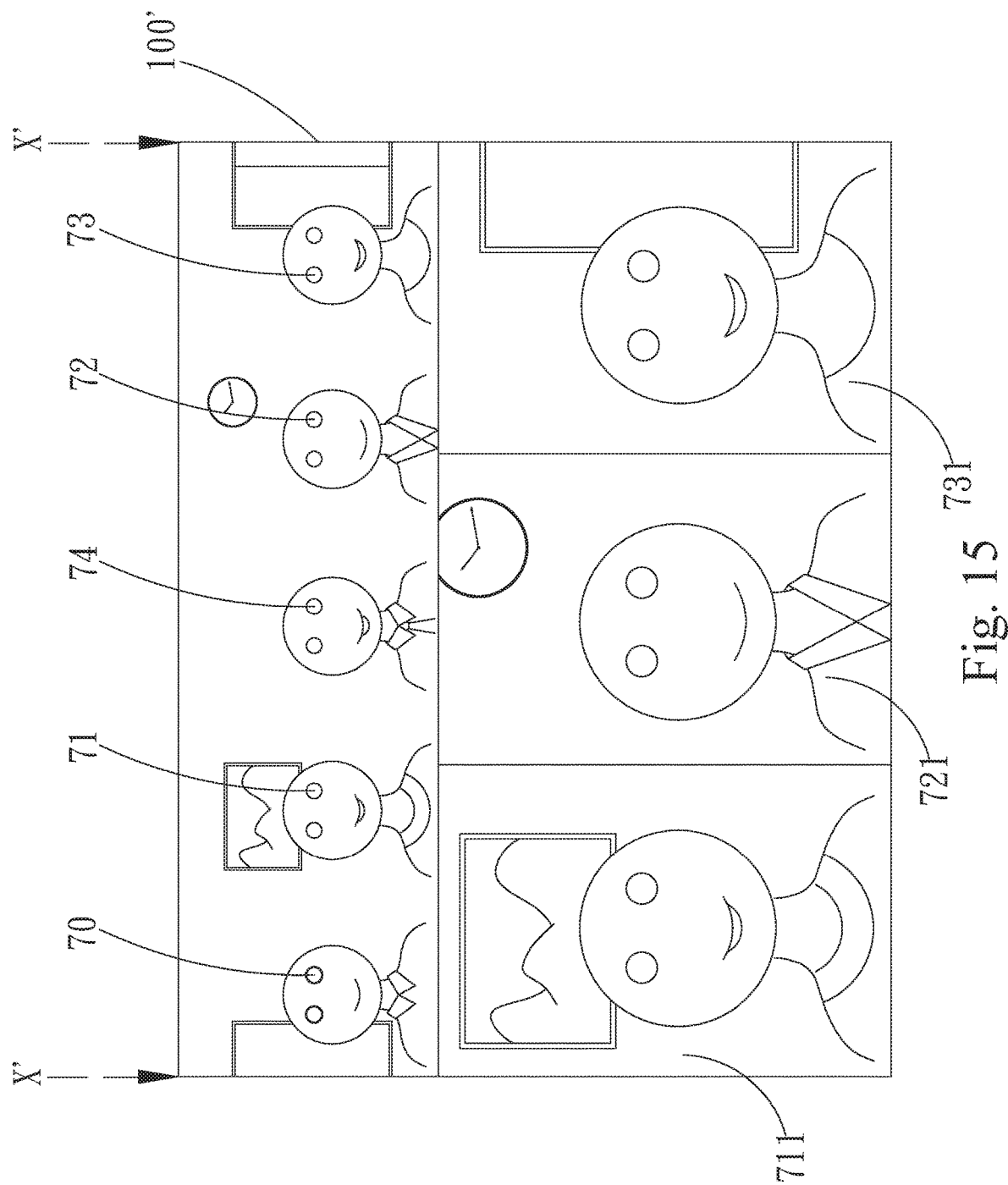
FIG. 15 is a schematic view showing another example of the spread two-dimensional panoramic picture of FIG. 14.

Further referring to FIG. 15, which provides an example of application of the video conference panoramic image spreading method for displaying the spread two-dimensional panoramic picture 100' in an alternative way, during displaying of the refreshed and updated spread two-dimensional panoramic picture 100' that includes the four conferee photographed subjects 70, 71, 74, 72, 73, at least one of the conferee photographed subjects 70, 71, 74, 72, or 73 may be selected for instantaneously magnifying, locking, and tracking for image displaying. In the example of FIG. 15, the conferee photographed subjects 71, 72, 73 are selected as target subjects for instantaneously magnifying, locking, and tracking and three magnified, locked, and tracked images 711, 721, and 731 of the target subjects are displayed on a lower side of the two-dimensional panoramic picture 100' to provide an instantaneous effect of magnifying, locking, and tracking to a video conference monitoring unit or a conference speech recording unit.

In the above, FIGS. 3-15 provide a video conference panoramic image spreading method according to the present invention, and the description and drawings related thereto as disclosed herein are provided for the purposes of being an example for easy explanation of the technical contents and features of the present invention and are not intended to unduly constrain the scope of the present invention. Further, any equivalent substitute and modification of the steps and the operations performed in the present invention as described herein are considered belonging to the spirit and scope of the present invention, which will be solely defined with the appended claims.

What is claimed is:

1. A video conference panoramic image spreading method, comprising the following steps:
   (a) acquiring a primitive panoramic picture or image, in which at least one panoramic camera is used to photograph and capture and thus acquire at least one primitive video conference panoramic picture or image;
   (b) performing bodily human features recognition, in which conferee photographed subjects contained in the at least one primitive video conference panoramic picture or image that is photographed and captured and thus acquired by the panoramic camera in Step (a) is individually subjected to bodily human features recognition;
   (c) searching out a dividing point for two-dimensional picture spreading and defining the dividing point as a starting point for the two-dimensional panoramic image spreading, in which searching is performed in the primitive video conference panoramic picture or image in which the conferee photographed subjects have been subjected to bodily human features recognition in Step (b) to find a dividing point that does not lead to cutting or dividing of bodily human features of the conferee photographed subjects, and the dividing point is taken as the starting point for spreading a two-dimensional panoramic image;
   (d) intercepting desired image regions according to the dividing point, in which cutting and intercepting regions of the primitive video conference panoramic picture or image are performed according to the dividing point found in Step (c), wherein cutting and intercepting are carried out primarily based on a region of each of the conferee photographed subjects in the primitive video conference panoramic picture or image in order to acquire at least one quasi-panoramic image;
   (e) carrying out combining and stitching on the quasi-panoramic image by using the starting point for two-dimensional image spreading, in which the quasi-panoramic image intercepted in Step (d) is subjected to combining and stitching according to the starting point for two-dimensional panoramic image spreading, which is the dividing point of Step (c); and
   (f) forming a two-dimensional panoramic picture, in which the quasi-panoramic image that has been subjected to combining and stitching in Step (e) forms a spread two-dimensional panoramic picture.

2. The video conference panoramic image spreading method according to claim 1, wherein the panoramic camera of Step (a) comprises a panoramic camera having a fisheye lens.

3. The video conference panoramic image spreading method according to claim 1, wherein the panoramic camera of Step (a) comprises a panoramic camera having multiple lenses.

4. The video conference panoramic image spreading method according to claim 1, wherein bodily human features recognition of Step (b) is applied as features recognition for at least one or a combination of at least two of human face, facial features, upper body contour, and dynamic face image of the conferee photographed subjects.

5. The video conference panoramic image spreading method according to claim 1, wherein an operation of searching out the dividing point for two-dimensional picture spreading and defining the dividing point as the starting point of the panoramic image carried out in Step (c) further comprises:
   (c1) randomly selecting a test dividing point, in which a test dividing point is randomly picked in the primitive video conference panoramic picture or image of which the conferee photographed subjects contained therein have been individually subjected to the bodily human features recognition in Step (b);
   (c2) identifying if the test dividing point cuts and divides bodily human features and carrying out Step (c21), if positive, and carrying out Step (c22), if negative, in which determination is made on whether bodily human features of any one of the conferee photographed subjects of Step (c1) is cut and divided by the test dividing point picked in Step (c1);
   (c21) moving the test dividing point, in which the test dividing point of Step (c1) is moved in a clockwise direction or a counterclockwise direction and repeating Step (c2);
   (c22) setting the test dividing point as the dividing point for two-dimensional picture spreading, in which a test dividing point that does not cut and divide, in Step (c2), the bodily human features of any one of the conferee photographed subjects of Step (c1) is taken as the dividing point for spreading of the two-dimensional picture; and
   (c3) ending.

6. The video conference panoramic image spreading method according to claim 1, wherein Step (a)-Step (f) are provided as image processing software pre-loaded in the panoramic camera of Step (a).

7. The video conference panoramic image spreading method according to claim 1, wherein the panoramic camera of Step (a) is connected to at least one image processor, and Step (a)-Step (f) are provided as image processing software pre-loaded in the image processor.

8. The video conference panoramic image spreading method according to claim 1, wherein the panoramic camera of Step (a) is connected to at least one smart communication device, and Step (a)-Step (f) are provided as image processing software pre-loaded in the smart communication device.

9. The video conference panoramic image spreading method according to claim 8, wherein the smart communication device to which the panoramic camera of Step (a) is connected comprises a smart mobile phone.

10. The video conference panoramic image spreading method according to claim 8, wherein the smart communication device to which the panoramic camera of Step (a) is connected comprises a tablet computer.

11. The video conference panoramic image spreading method according to claim 1, wherein the panoramic camera of Step (a) is connected to at least one desk-top computer, and Step (a)-Step (f) are provided as image processing software pre-loaded in the desk-top computer.

12. The video conference panoramic image spreading method according to claim 1, wherein the panoramic camera of Step (a) is connected to at least one notebook computer, and Step (a)-Step (f) are provided as image processing software pre-loaded in the notebook computer.

* * * * *